(12) United States Patent
Adams et al.

(10) Patent No.: US 7,739,396 B2
(45) Date of Patent: Jun. 15, 2010

(54) SYSTEM, METHOD AND PROGRAM FOR FIELD SERVICE OF COMPUTERS

(75) Inventors: Douglas B. Adams, Milliken, CO (US); Michael D. Holton, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 11/501,495

(22) Filed: Aug. 8, 2006

(65) Prior Publication Data

US 2008/0040495 A1   Feb. 14, 2008

(51) Int. Cl.
G06F 15/16 (2006.01)

(52) U.S. Cl. .................. 709/230; 709/203; 709/217; 709/219; 709/220; 709/221; 705/26; 705/27

(58) Field of Classification Search .............. 709/224, 709/203, 217, 218, 219, 227, 223, 225, 226, 709/220, 221, 230; 705/26, 27
See application file for complete search history.

(56) References Cited

U.S. PATENT DOCUMENTS

| | | | | |
|---|---|---|---|---|
| 5,752,042 | A | 5/1998 | Cole et al. | 395/712 |
| 6,026,366 | A * | 2/2000 | Grube | 705/10 |
| 6,074,434 | A | 6/2000 | Cole et al. | 717/11 |
| 6,615,255 | B1 * | 9/2003 | Blaszczak | 709/220 |
| 6,966,060 | B1 * | 11/2005 | Young et al. | 717/177 |
| 2002/0065680 | A1 * | 5/2002 | Kojima et al. | 705/1 |
| 2004/0114557 | A1 | 6/2004 | Bryan et al. | 370/338 |
| 2004/0253981 | A1 | 12/2004 | Blume et al. | 455/552.1 |
| 2005/0034115 | A1 | 2/2005 | Carter et al. | 717/173 |
| 2005/0058108 | A1 | 3/2005 | Ekberg et al. | 370/338 |
| 2005/0080680 | A1 | 4/2005 | Elam et al. | 705/22 |
| 2005/0138077 | A1 | 6/2005 | Michael et al. | 707/104.1 |
| 2005/0198228 | A1 * | 9/2005 | Bajwa et al. | 709/220 |
| 2005/0289401 | A1 | 12/2005 | Goin et al. | 714/47 |
| 2006/0240868 | A1 * | 10/2006 | Kaplan et al. | 455/558 |

* cited by examiner

*Primary Examiner*—Ario Etienne
*Assistant Examiner*—Barbara N Burgess
(74) *Attorney, Agent, or Firm*—Arthur J. Samodovitz

(57) ABSTRACT

System, method and program product for managing field service of a computer. Configuration information of the computer is wirelessly sent to a remote server. In response, a determination is made as to a recommended list of updates to install in the computer which are compatible with the configuration information and not currently resident in the computer. The recommended list is wirelessly sent to the computer. In response, the recommended list is written into an RFID associated with the computer such that the RFID broadcasts the recommended list. The RFID also broadcasts an identification of the computer. A person visits a room containing the computer and uses an RFID reader to read the broadcast from the RFID. Based on the broadcast read by the RFID reader, a determination is made whether to install the recommended list of updates into the computer.

8 Claims, 3 Drawing Sheets

SYSTEM, METHOD AND PROGRAM FOR FIELD SERVICE OF COMPUTERS

FIELD OF THE INVENTION

The invention relates generally to computer systems, and more specifically to field service of computers.

BACKGROUND OF THE INVENTION

Computers often need updates to hardware or software components already resident in the computer, or installation of new hardware or software components. In many cases, software can be installed through a network such as the Internet, and there is no need for a field service technician or other person to travel to the computer and manually install the software. However, in other cases, it is necessary or preferable for manual installation. For example, manual installation of software is necessary or preferable when the amount of software to be installed is very large (compared to the bandwidth of the network), or if the network connection of the computer has failed. Hardware upgrades, such as upgrades to memory, storage or processor, must be done manually.

It was known for a client computer to send its configuration, i.e. processor size and type, memory size, operating system type and version, installed software type and version, installed software applications, serial number, latest network login, and host name, to a service center computer. The service center computer can then determine what updates are recommended and not yet installed in the client computer. See U.S. Pat. Nos. 5,752,042 and 6,074,434 to Cole. It was also known for an administrator to manually enter the configuration of a client computer at the service center computer when the client computer is issued to the customer. The configuration information assists the service center in determining what hardware or software updates are recommended and not currently resident in the customer's computer.

It is common today for multiple computers to be physically located in the same room. These are sometimes called "server farms" or "call centers." When the field service technician arrives at the server farm or other collection of computers, it takes some effort by the technician to physically locate the computer to receive a recommended update (software or hardware). Typically, the technician has to check the serial numbers of the computers, which tend to be obscure, and the technician may have to check several computer before locating the target computer. Also, the technician may want to verify that the hardware updates, software updates or new software that the technician was sent to install are appropriate for the target computer. Thus, the technician may query the target computer to verify the current configuration of the computer and compare the current configuration to what is listed on the work order. If the network connection is viable, the technician can also query the service center computer to confirm the software to install. However, this takes some additional effort by the technician.

RFIDs are currently known to store and broadcast identifications of products to which they are attached. It was also known that an RFID could store and broadcast configuration information about a computer to which it was attached. See US Published Patent Application 2005/0198228 A1. It was also known for an RFID reader/writer to dynamically transmit data to an RFID which the RFID will then store and broadcast.

An object of the present invention is to provide a system and method to assist a field service technician in the task of performing recommended hardware and software updates to a computer.

SUMMARY OF THE INVENTION

The present invention resides in system, method and program product for managing field service of a computer. Configuration information of the computer is wirelessly sent to a remote server. The configuration information is wirelessly received by the remote server. In response, a determination is made as to a recommended list of updates to install in the computer which are compatible with the configuration information and not currently resident in the computer. The recommended list is wirelessly sent to the computer. The recommended list is wirelessly received at the computer. In response, the recommended list is written into an RFID associated with the computer such that the RFID broadcasts the recommended list. The RFID also broadcasts an identification of the computer. A person visits a room containing the computer and uses an RFID reader to read the broadcast from the RFID. Based on the broadcast read by the RFID reader, a determination is made whether to install the recommended list of updates into the computer.

DETAILED DESCRIPTION OF THE PREFERRED EMBODIMENTS

Figure 1:
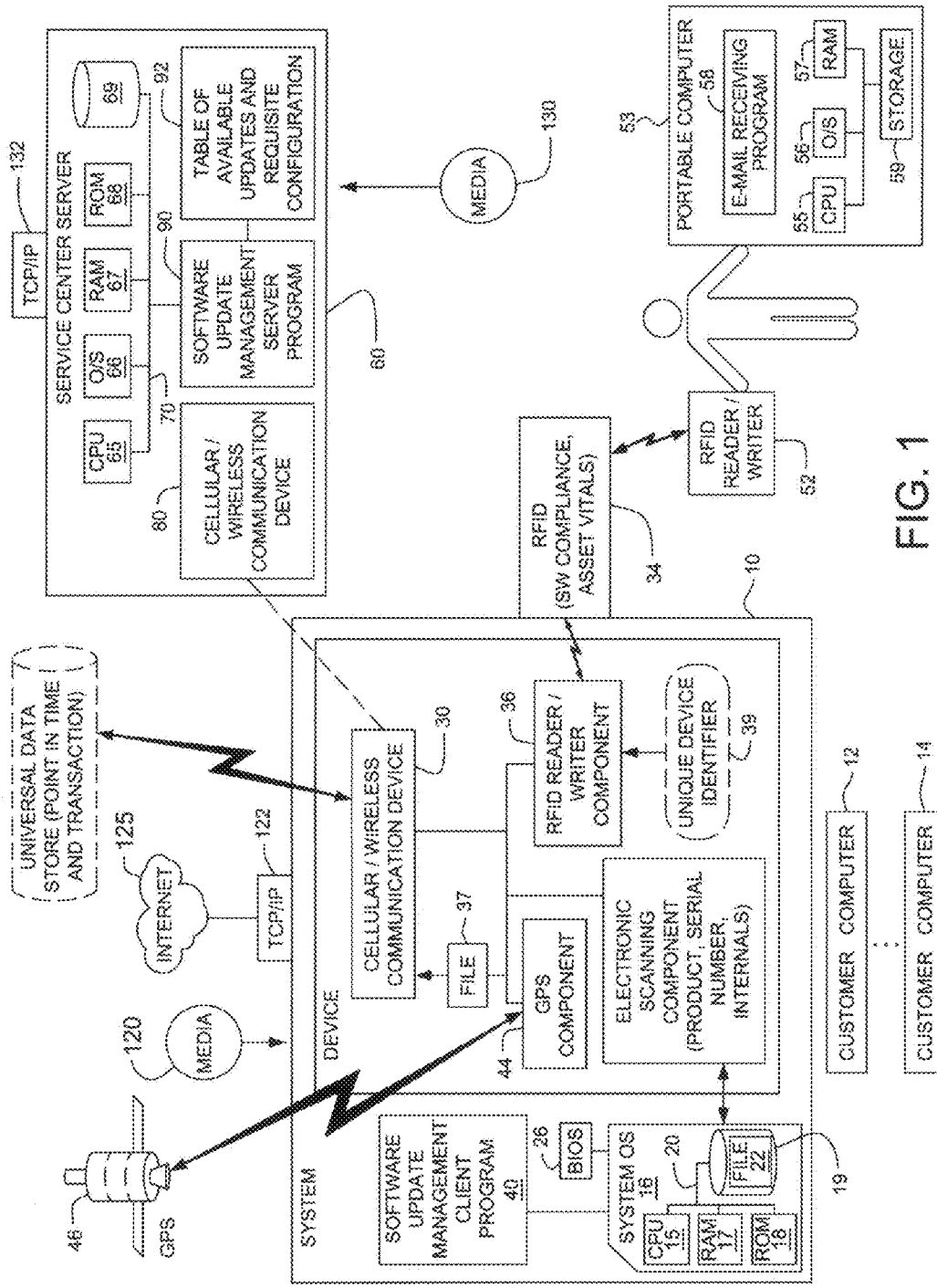
FIG. 1 is a block diagram of a distributed computer system including a customer computer with a software management client program and a service center computer with a software management server program, which incorporate the present invention.

The present invention will now be described in detail with reference to the figures. FIG. 1 illustrates multiple computers 10, 12 and 14, for example in a same room or site. Computers 10, 12 and 14 are similar to each other except for differences in configuration, including different application programs, operating system and/or hardware (i.e. processor, memory, storage). Computer 10 includes a known CPU 15, operating system 16, RAM 17, ROM 18 and hard drive storage 19 on a common bus 20. A file 22 within storage 19 stores a serial number and configuration information for computer 10. The configuration information includes processor type and size, memory size, storage size, operating system type and version, serial number, latest network login, IP address, and hostname of computer 10, and software applications and versions currently installed on computer 10. A software update management client program 40 creates file 22 by scanning BIOS 26 and hard drive 19 of the computer, and writing the results to file 22. Computer 10 also includes a known type of cellular/wireless communication device 30 such as found in a known type of cellular telephone. Computer 10 includes a known type of Active RFID 34 which broadcasts the serial number or unique device identifier 39 and configuration information of computer 10. Periodically and upon change of the configuration of computer 10, the software update management client program 40 fetches the serial number and current configuration information from file 22 and supplies it to the RFID reader/writer 36. In response, the RFID reader/writer 36 writes the serial number and current configuration information into the RFID device 34 for broadcast. Computer 10 also includes an optional GPS unit 44 which obtains the geographic location of computer 10 from satellites 46, and supplies the geographic location information to RFID reader/writer 36. In response, RFID reader/writer 36 writes the geographic location information into RFID 34 for broadcast. Program 40 also supplies the serial number and current configuration information to wireless communication device 30 which transmits the serial number and current configuration of computer 10 to a service center server 60. Service center server 60 comprises a known CPU 65, operating system 66, RAM 67, ROM 68 and storage 69 on a common bus 70. Server 60 includes a known type of cellular/wireless communication device 80 such as found in a known type of cellular telephone to receive the serial number and current configuration information from computer 10. Server 60 also includes a software update management server program 90 to determine what hardware and software updates are recommended for computer 10, not resident in computer 10 and should be installed in computer 10. Server computer 40 then transmits a list of such updates to computer 10, so that RFID reader/writer 36 can write it into RFID 34 for broadcast. Consequently, when a field service technician 97 visits the room containing computer 10 (and other computers as well), the technician can easily locate computer 10 with an RFID reader/writer 52 carried by the technician. With the RFID reader/writer 52, the technician can also verify the current configuration of computer 10 and list of updates to install and determine if they match what the server 60 specified.

Figure 2A:
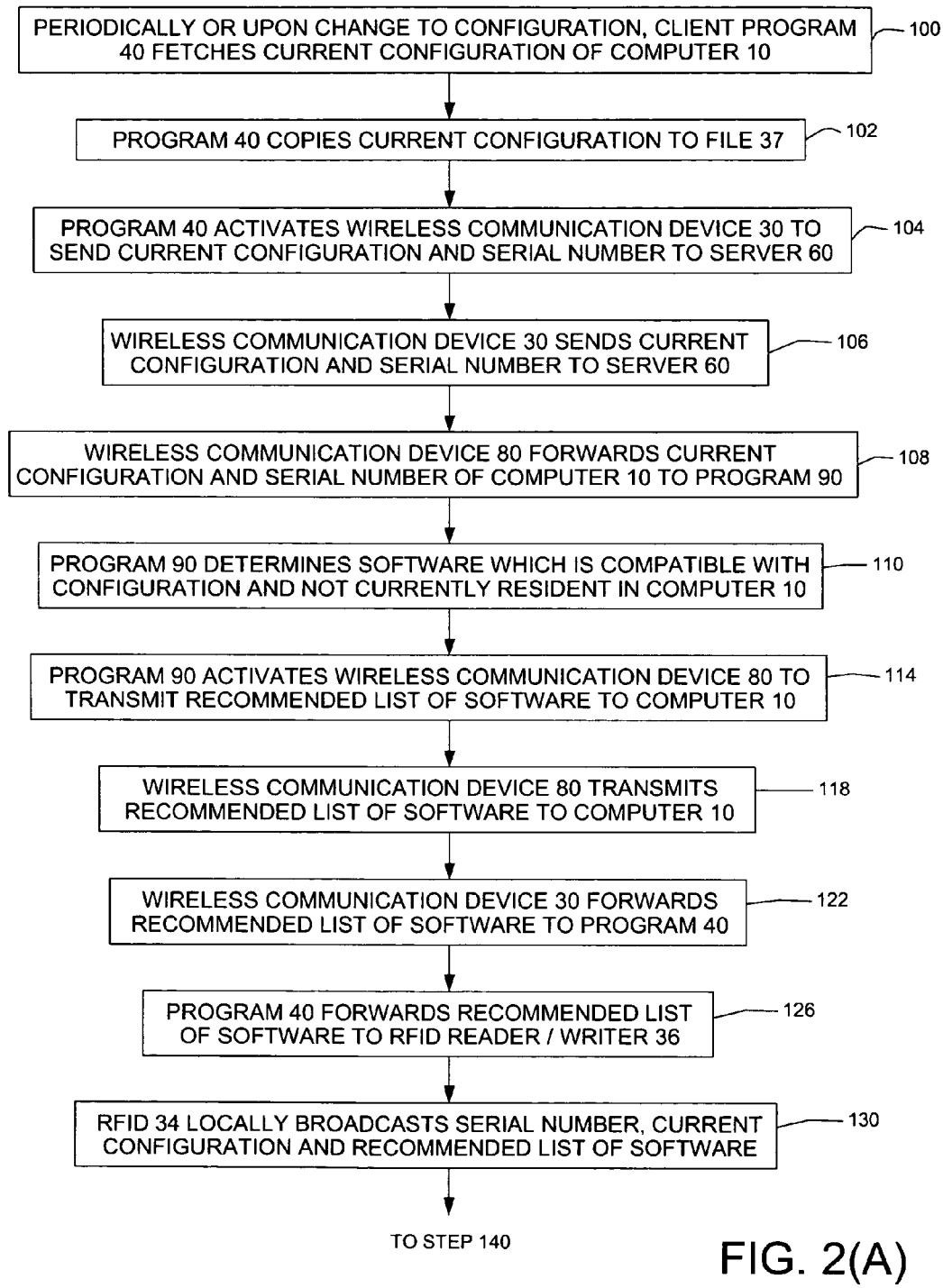
FIGS. 2(A) and 2(B) form a flow chart of the software management client program and software management server program of FIG. 1.
Figure 2B:
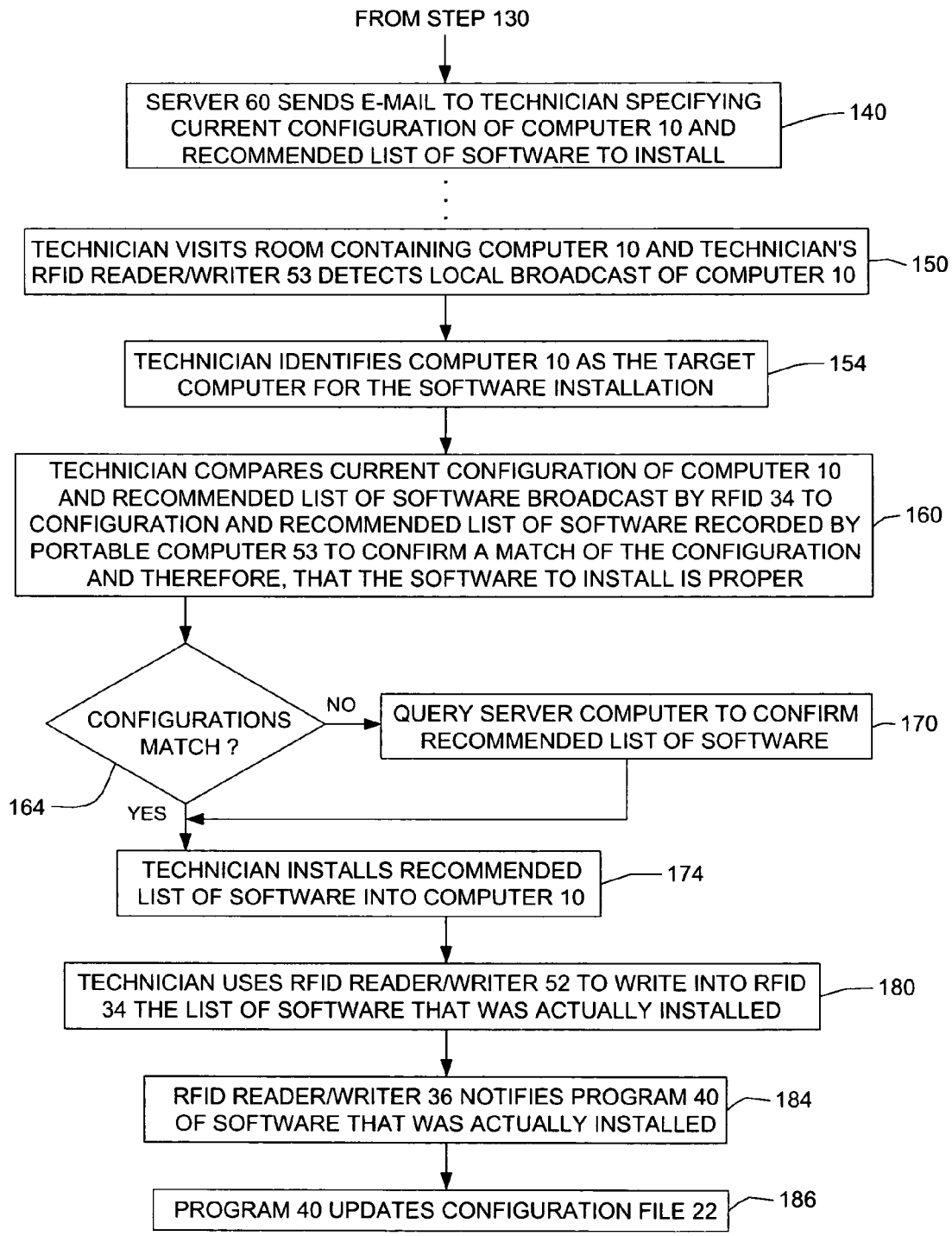

FIG. 2 illustrates the foregoing process in more detail. According to the present invention, periodically (such as daily) or when there is a change to the configuration of computer 10, client program 40 in customer computer 10 fetches the serial number and current configuration information (and optionally the GPS location) of computer 10 from file 22 (step 100) and copies it to an RFID reader/writer and telecommunications file 37 (step 102). File 37 also contains the telephone number or IP address of wireless communication device 80 in server 60. Next, client program 40 activates wireless communication device 30 to call wireless communication device 80 in server 60 and supplies the serial number and current configuration information (and GPS location) to wireless communication device 30 (step 104). In response, wireless communication device 30 wirelessly transmits the serial number and current configuration information (and GPS location) of computer 10 to wireless communication device 80 in server 60 (step 106). Upon receipt, wireless communication device 80 forwards the serial number and configuration information (and GPS location) to server program 90 (step 108). In response, server program 90 reads a table 92 which contains a list of all recommended updates and configurations specifications requiring those updates. Next, program 90 determines a list of updates recommended for the current configuration of computer 10 and not currently resident in computer 10 (step 110). Next, program 90 activates wireless communication device 80 to wirelessly call wireless communication device 30 in computer 10 and forwards the serial number (for verification purposes) and the recommended list of updates to be installed in computer 10 (step 114). In response, wireless communication device 80 wirelessly transmits the serial number and recommended list of updates to wireless communication device 30 in computer 10 (step 120). Upon receipt, wireless communication device 30 supplies the serial number and recommended list of updates to client program 40 (step 122). In response, client program 40 verifies that the serial number that was received matches the serial number of computer 10, and if so, forwards the recommended list of updates to file 37 and RFID reader/writer 36 (step 126). In response, RFID reader/writer 36 writes the recommended list of updates into the RFID 34 for local broadcast by RFID 34 (step 130).

After transmitting to computer 10 the recommended list of updates to be manually installed on computer 10, server 60 notifies field service technician 97 by e-mail to an email receiving program 58 in a portable computer 53 (such as a laptop or PDA) of the technician (step 140). Portable computer 53 includes a CPU 55, operating system 56, RAM 57 and storage 59. The notification includes the serial number and physical location (optionally, the GPS geographic location) of the target computer 10, the current configuration of computer 10 and the recommended list of updates to manually install in computer 10. (If the field service server 60 does not know the geographic location of the customer computer 10 based on records within server 60, then the GPS information received from wireless communication device 30 can be used to locate computer 10.) In response, the field service technician 97 subsequently visits the site and room containing the computers 10, 12 and 14 and carries a known type of RFID reader/writer 52 and the portable computer 53. RFID 34 has a limited range of broadcast and RFID reader/writer 52 likewise has a limited range of reception. Consequently, when the field service technician 97 comes near to computer 10, the RFID reader/writer 52 receives the broadcast from RFID 34. The broadcast includes the serial number of the computer in which to install the updates. Thus, field service technician 97 can identify and verify which computer needs the update without having to visually inspect the serial numbers on the computers 10, 12 and 14 (step 154). There can be many computers in the same room, and the serial numbers on the computers may be small or positioned at obscure locations, so the foregoing system and process facilitates field service technician 97 in identifying and verifying which computer needs the recommended list of updates. The broadcast also includes the current configuration information of computer 10 and the recommended list of updates to be installed in computer 10. This recommended list of updates was transmitted earlier by server 60 in step 122 and written into RFID 34. The recommended list of updates obtained by RFID reader/writer 52 from RFID 34 assists field service technician 97 in verifying what updates to install in computer 10. Field service technician 97 will also read from RFID 34 the current configuration of computer 10 and compare the current configuration to the configuration information previously obtained from server 60 in step 140 and written into RFID 34, to determine if any changes have been made to the configuration since the technician received the latest notification from server 60 (step 160). If so, then the update identified by program 90 for which the technician has been sent to install may not be proper for the current configuration (decision 164, no branch), and the technician queries server 60 to confirm the recommended list of updates (step 170). If the configuration information broadcast by the RFID 34 is the same as what is recorded on the portable computer of the field service technician (decision 164, yes branch), then the recommended updates identified by program 90 for which the technician has been sent to install is proper for the current configuration and the technician manually performs the recommended updates (step 174). (If the configuration of computer 10 was updated after being sent to server 60 in step 106 but before the field service technician begins to perform the recommended updates, program 40 would have initiated the foregoing process again to transmit the current configuration to server 60, program 80 would have repeated the foregoing process to determine the recommended updates to install, and notified the technician's portable computer of the current configuration of computer 10 and the latest, recommended list of updates to perform on computer 10.)

After completing the installation of the recommended updates, the field service technician optionally enters into RFID reader/writer 52 a list of the updates that the field service technician actually installed and then operates RFID reader/writer 52 to write into RFID 34 the list of updates that were actually installed (step 182). In response, the RFID reader/writer 36 reads from RFID 34 the list of updates that were actually installed, writes the list into file 37 and notifies program 40 that updates have actually been installed (step 184). In response, program 40 reads from file 37 the list of updates that were actually installed and then updates the configuration information in file 22 to include the list of updates that were actually installed (step 186). Consequently, during a later iteration of the foregoing process, program 40 will initiate sending of the updated configuration information to server 60 and server 60 will then know what updates have already been installed in computer 10 and need not be installed again.

Program 40 can be loaded into computer 10 from a computer readable media 120 such as magnetic tape or disk, optical disk, DVD, semiconductor memory, memory stick or downloaded from the Internet 125 via TCP/IP adapter card 122. Alternately, the function of program 40 can be performed by hardware incorporated into computer 10.

Program 90 can be loaded into computer 60 from a computer readable media 130 such as magnetic tape or disk, optical disk, DVD, semiconductor memory, memory stick or downloaded from the Internet 125 via TCP/IP adapter card 132.

Based on the foregoing, a system, method and program for field service of computers have been disclosed. However, numerous modifications and substitutions can be made without deviating from the scope of the present invention. For example, communication from the service center server to the computer may be single-direction, instead of bidirectional. Therefore, the present invention has been disclosed by way of illustration and not limitation, and reference should be made to the following claims to determine the scope of the present invention.

What is claimed:

1. A method for managing field service of a first computer, the method comprising the steps of:
   a remote server wirelessly receiving from the first computer, configuration information of the first computer and an identification of the first computer, and in response, the remote server determining a recommended list of updates to install in the first computer which are compatible with the configuration information and not currently installed in the first computer, and the remote server wirelessly sending the recommended list to the first computer;
   a portable RFID reader supported adjacent to the first computer reading and displaying information broadcast from an RFID attached to the first computer, the information broadcast from the RFID attached to the first computer including the recommended list of updates sent by the remote server, the configuration information of the first computer and the identification of the first computer; and
   the remote server sending to a portable computer through a network separate from the RFID attached to the first computer a recommended list of updates for the first computer, configuration information for the first computer, and the identification of the first computer, and the portable computer displaying the recommended list of updates, the configuration information and the identification of the first computer sent by the remote server for the first computer through the network, the portable computer being supported adjacent to the RFID reader to enable the user to compare the recommended list of updates, the configuration information and the identification of the first computer sent by the remote server to the portable computer through the network to the recommended list of updates, the configuration information and identification of the first computer broadcast by the RFID attached to the first computer and read by the RFID reader.

2. The method set forth in claim 1 further comprising the step of instructing the user to install into the first computer the recommended list of updates broadcast by the RFID attached to the first computer and read by the RFID reader if the recommended list of updates, the configuration information and the identification of the first computer sent by the remote server to the portable computer through the network match the recommended list of updates, the configuration information and the identification of the first computer broadcast by the RFID attached to the first computer and read by the RFID reader.

3. The method set forth in claim 1 further comprising the steps of:
   an RFID writer in a same device as the RFID reader writing into the RFID attached to the first computer a list of updates that the user actually installed in the first computer, and in response, the first computer updating its configuration information in a file separate from the RFID attached to the first computer to reflect the updates that the user actually installed in the first computer.

4. The method set forth in claim 1 wherein said RFID reader is supported adjacent to the first computer by the user, and said portable computer is supported adjacent to said RFID reader by the user.

5. The method set forth in claim 1 further comprising the step of the RFID attached to the first computer broadcasting the recommended list of updates sent by the remote server, the configuration information of the first computer and the identification of the first computer.

6. A system for managing field service of a first computer, said system comprising:
   a remote server including a wireless receiver to receive from the first computer, configuration information of the first computer and an identification of the first computer, and first program instructions, responsive to the first computer configuration information and identification of the first computer wirelessly received from first computer, to determine a recommended list of updates to install in the first computer which are compatible with the configuration information and not currently installed in the first computer, and a wireless transmitter to wirelessly send the recommended list to the first computer;
   a portable RFID reader supported adjacent to the first computer to read and display information broadcast from an RFID attached to the first computer, the information broadcast from the RFID attached to the first computer including the recommended list of updates sent by the remote server, the configuration information of the first computer and the identification of the first computer; and
   second program instructions in the remote server to send to a portable computer through a network separate from the RFID attached to the first computer a recommended list of updates for the first computer, configuration information for the first computer, and the identification of the first computer, and the portable computer including third program instructions to initiate display of the recommended list of updates, the configuration information and the identification of the first computer sent by the remote server for the first computer through the network, the portable computer being supported adjacent to the RFID reader to enable the user to compare the recommended list of updates, the configuration information and the identification of the first computer sent by the remote server to the portable computer through the network to the recommended list of updates, the configuration information and identification of the first computer broadcast by the RFID attached to the first computer and read by the RFID reader; and a first CPU, a first computer readable memory and a first computer readable storage media in said remote server; and a second CPU, a second computer readable memory and a second computer readable storage media in said portable computer; and wherein the first and second program instructions are stored in the first computer readable storage media for execution by the first CPU via the first computer readable memory; and the third program instructions are stored in the second computer readable storage media for execution by the second CPU via the second computer readable memory.

7. The system set forth in claim 6 further comprising an RFID writer connected to the RFID reader to write into the RFID attached to the first computer a list of updates that the user actually installed in the first computer; and wherein the system includes the first computer; and the first computer including means, responsive to the list of updates that are actually written by the RFID writer into the RFID attached to the first computer, for updating the configuration information of the first computer in a file in the first computer separate from the RFID attached to the first computer to reflect the updates that the user actually installs in the first computer.

8. The system set forth in claim 6 wherein said RFID reader is supported adjacent to the first computer by the user, and said portable computer is supported adjacent to said RFID reader by the user.

* * * * *